UNITED STATES PATENT OFFICE.

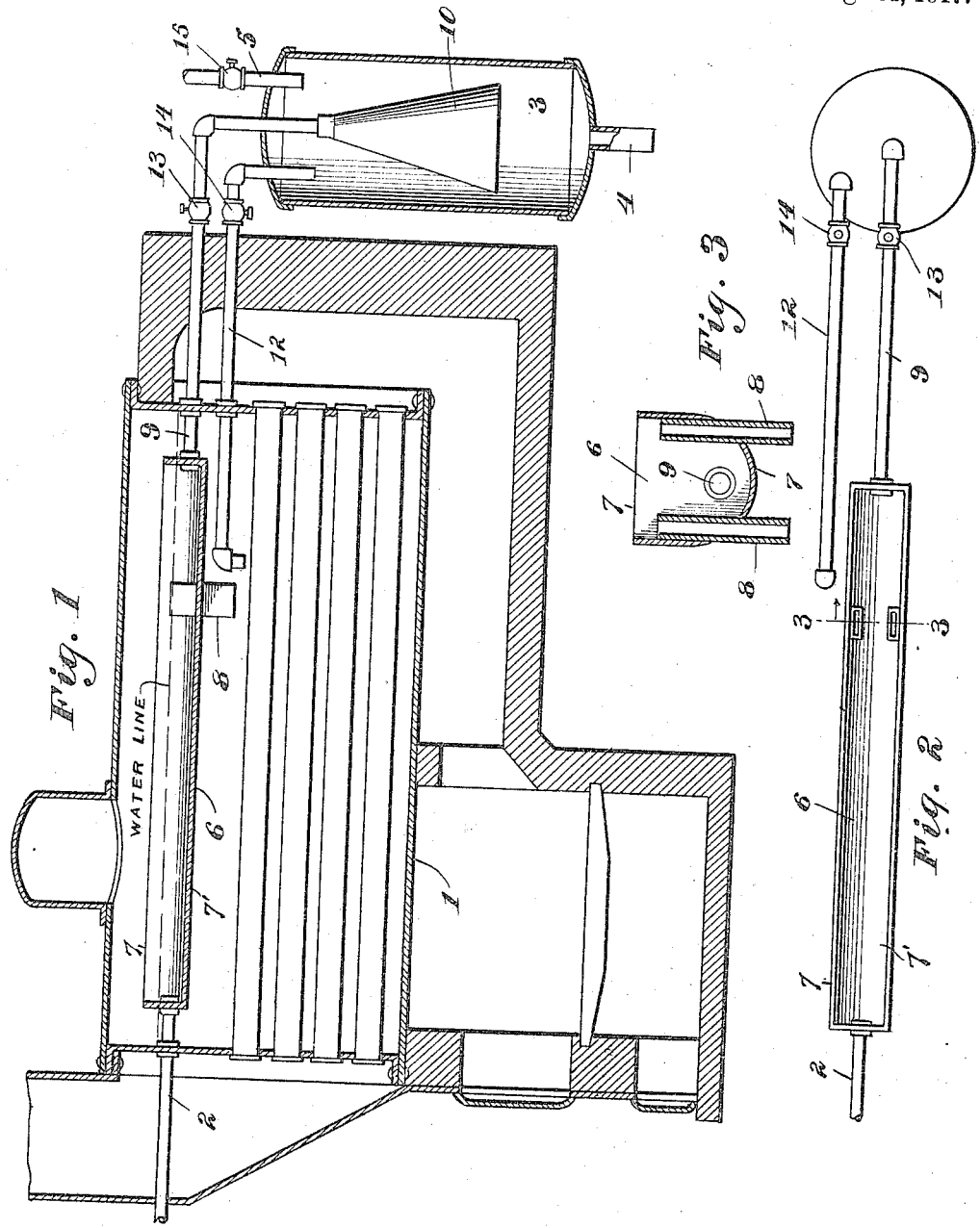

JOHN H. MUTCHLER, OF GIBSONBURG, OHIO.

WATER-PURIFYING DEVICE FOR BOILERS.

1,237,942.

Specification of Letters Patent.

Patented Aug. 21, 1917.

Application filed November 6, 1915. Serial No. 60,137.

*To all whom it may concern:*

Be it known that I, JOHN H. MUTCHLER, a citizen of the United States, residing at Gibsonburg, in the county of Sandusky and State of Ohio, have invented new and useful Improvements in Water-Purifying Devices for Boilers, of which the following is a specification.

This invention relates to a device which when applied to a boiler may be used to separate and collect from the feed water, the scale forming matter therein.

The primary object of the invention is to provide a device for this purpose in which the feed water when injected into the boiler to which the device is applied, is received in a heating pan arranged above a sediment collecting tank exteriorly of the boiler and having connection therewith and with the pan, so that the feed water will be caused by gravity to flow from the pan and through the tank into the boiler, thus insuring an uninterrupted flow of purified feed water and the heavier particles of scale forming matter which are precipitated upon the bottom of the pan by the action of heat being carried into the sediment collecting tank by the flow of the water.

Another object of the invention is to provide the device with a feed water heating pan having overflow pipes passing through the bottom of the pan and extending below the low water level in the boiler with the upper ends of said pipes so arranged with relation to the top of the pan that should the pipes connecting the sediment tank with the boiler and pan become clogged, the water fed to the pan will be prevented from overflowing the sides of the pan resulting in the creation of a water hammer within the boiler and the disturbing of the heavier particles of scale forming matter collecting in the bottom of the pan to such an extent as to permit these particles to be carried over the sides of the pan by the water and into the boiler.

With these and other objects in view, the invention resides in the novel combination and arrangement of parts, which will be hereinafter described and particularly pointed out in the claims.

The preferred embodiment of the invention has been illustrated in the accompanying drawing, although no restriction is necessarily made to the precise details of construction therein shown, as changes, alterations, and modifications, within the scope of the claims may be resorted to when desired.

In the drawing:

Figure 1 is a vertical longitudinal section through a boiler of the tubular type and showing the improved feed water purifying device applied thereto.

Fig. 2 is a top plan view of the purifying device removed from the boiler.

Fig. 3 is a vertical transverse section through the feed water heating pan and the over-flow pipes associated therewith.

Like characters of reference denote corresponding parts throughout the several views in the drawing.

Referring now to the drawing in detail, the numeral 1 designates a boiler of the tubular type having extending therein the discharge end of a feed water pipe 2, the other end of which is adapted for connection with a suitable source of feed water supply (not shown in the drawing).

Arranged exteriorly of the boiler is a sediment collecting tank 3 having connected with the bottom thereof a pipe 4 through which the sediment collected in the tank may be discharged by steam admitted to the tank for this purpose through a pipe 5 having its discharge end extending through the top of the tank as shown.

Arranged within the boiler 1 and extending within the steam space therein is a feed water heating pan 6, provided with an open top 7 and a rounded bottom 7′ arranged above the upper end of the sediment collecting tank 3. The pan 6 has passing through the bottom thereof to extend below the low water level in the boiler overflow pipes 8, the upper ends of which terminate below the open top of the pan for a purpose which will hereinafter appear. The ends of the pan 6 which are closed are connected, respectively, with the discharge end of the feed water supply pipe 2 and the receiving end of a discharge pipe 9, said pipe 9 extending exteriorly of the boiler and passing through the top of the tank 3, said pipe having its discharge end provided with a funnel-shaped baffle member 11.

A return pipe 12 which extends within the tank 3 through the top thereof has its discharge end arranged within the boiler 1 beneath the rounded bottom of the feed water heating pan 6.

From the above described manner of arranging the feed water heating pan above the top of the sediment collecting tank and connecting said tank with the pan and boiler, it will be seen that the feed water upon entering the pan 6 will be subjected to the action of heat to cause a gradual settling of the particles of scale forming matter therein and that the heated water will be caused by gravity to flow through the discharge pipe 9 and through the tank 3 and into the boiler 1 through the return pipe 12, the flowing water carrying the heavier particles of scale forming matter which have been precipitated upon the bottom of the pan 6 within the tank 3, thereby insuring an uninterrupted flow of purified feed water from the tank into the boiler.

Should the discharge pipe 9 or return pipe 12 become clogged, the water in the pan 6 will rise above the upper ends of the overflow pipes 8 and pass therethrough into the water in the boiler without overflowing the sides of the pan resulting in the agitation of the heavier particles of scale forming matter collected in the bottom of the pan and the carrying of the same by the water over the sides of the pan and into the boiler.

Through the provision of the overflow pipes 8, it will be seen that when the pipes 9 and 12 have become clogged and comparatively cool water is injected into the heating pan, the water will be prevented from overflowing the sides of the pan and through contact with the steam in the boiler creating a vacuum resulting in the formation of a water hammer within the boiler.

The pipes 9 and 12 are provided respectively with valves 13 and 14 for controlling the passage of fluid therethrough, while the pipe 5 is provided with a valve 15 controlling the admission of steam through the tank 3 for the purpose described.

From the foregoing description, taken in connection with the accompanying drawing, it is at once apparent that a feed water heating and purifying device has been provided which though simple in construction and inexpensive of manufacture, is highly efficient in use.

Having thus described the invention, what I claim is:

1. In a device of the class described, a boiler, a feed water heating pan within the boiler extending within the steam space therein, said pan having an open top, a feed water pipe having its discharge end connected with one end of said pan, a sediment tank arranged exteriorly of the boiler and lower than the bottom of the heating pan, a feed water discharge pipe having connection with the other end of said pan and with the sediment collecting tank, a return pipe connected with the sediment collecting tank and having its discharge end arranged below the bottom of the said heating pan, and overflow pipes passing through the bottom of said pan and extending below the low water level in the boiler, said overflow pipes having their upper ends extending above the connection of said feed water supply and discharge pipes with the heating pan.

2. In a device of the class described, a boiler, a feed water heating pan within the boiler extending within the steam space therein and having an open top and a rounded bottom, and overflow pipes having the upper ends spaced from the top of the pan and passing through the bottom thereof to extend below the low water level in the boiler for the purpose set forth.

In testimony whereof I affix my signature in presence of two witnesses.

JOHN H. MUTCHLER.

Witnesses:
GEORGE P. KNEIP,
T. J. COOK.

Copies of this patent may be obtained for five cents each, by addressing the "Commissioner of Patents, Washington, D. C."